United States Patent [19]

Dauth et al.

[11] Patent Number: 5,703,190
[45] Date of Patent: Dec. 30, 1997

[54] CROSSLINKABLE COMPOSITIONS

[75] Inventors: Jochen Dauth, Burghausen; Christian Herzig, Feichten-Waging; Bernward Deubzer, Burghausen; Klaus Schnitzer, Julbach, all of Germany; David Huettner, Tecumseh, Mich.

[73] Assignee: Wacker-Chemie GmbH, Munich, Germany

[21] Appl. No.: 697,359

[22] Filed: Aug. 23, 1996

[30] Foreign Application Priority Data

Nov. 7, 1995 [DE] Germany ............... 195 41 451.9

[51] Int. Cl.$^6$ ................................................. C08G 77/06
[52] U.S. Cl. ........................... 528/12; 528/15; 525/478
[58] Field of Search ................... 528/15, 12; 525/478

[56] References Cited

U.S. PATENT DOCUMENTS

| | | |
|---|---|---|
| 2,813,218 | 11/1957 | Klöpping et al. |
| 3,249,581 | 5/1966 | Nelson. |
| 3,436,366 | 4/1969 | Modic. |
| 4,292,434 | 9/1981 | Lindner et al. |
| 4,559,396 | 12/1985 | Sasaki et al. |
| 4,603,215 | 7/1986 | Chandra et al. |
| 5,095,085 | 3/1992 | Hara et al. ................... 528/15 |
| 5,241,034 | 8/1993 | Herzig et al. |

FOREIGN PATENT DOCUMENTS

| | | |
|---|---|---|
| 0094185 | 11/1983 | European Pat. Off. |
| 0154411 | 9/1985 | European Pat. Off. |
| 110370 | 4/1987 | European Pat. Off. |
| 0622420 | 11/1994 | European Pat. Off. |
| 1141868 | 2/1969 | United Kingdom. |

OTHER PUBLICATIONS

Derwent Abstract AN 94-334613 corresponds to EP-A0622420.
CA 113:61033m, Nippon Kagaku Kaishi, 1990. 5. pp. 541–546 by H. Yasuaki et al.
Angew. Chem. 103 (1991) Nr. 4, pp. 439–441.
Organometallics 1987, 6, 191–192.
English Derwent Abstract corresponding to EP-A 622 420.

*Primary Examiner*—Melvyn I. Marquis
*Attorney, Agent, or Firm*—Martin Connaughton

[57] ABSTRACT

The present invention relates to crosslinkable compositions are described, containing (1) organosilicon compounds which have radicals containing aliphatic carbon-carbon multiple bonds, and
(2) organosilicon compounds having Si-bonded hydrogen atoms, or
(3) organosilicon compounds where radicals with aliphatic carbon-carbon multiple bonds and Si-bonded hydrogen atoms are present in the same compound,
(4) catalysts which promote the addition of Si-bonded hydrogen onto aliphatic multiple bond, and
(5) agents which retard the addition of Si-bonded hydrogen onto aliphatic multiple bond at room temperature, of the formula $$R^1-C\equiv C-\underset{X}{C}-(R^3)_{\overline{x}}(C=C)_{\overline{y}}(R^3)_{\overline{x}}(C=C)_{\overline{y}}(R^3)_{\overline{x}}(C=C)_{\overline{y}}R^6 \quad (I)$$

with $R^2$ on the central C, and $R^4, R^5$ on each $C=C$ group.

in which $R^1, R^2, R^4, R^5$ and $R^6$ are identical or different and are a hydrogen atom or a monovalent, substituted or unsubstituted hydrocarbon radical having 1 to 12 carbon atoms per radical, $R^3$ is a divalent hydrocarbon radical having 1 to 6 carbon atoms per radical, X is a radical of the formula —OH, —Cl, Br and —CN, and x and y are identical or different and are 0 or 1, with the proviso that there is at least one double bond.

4 Claims, No Drawings

CROSSLINKABLE COMPOSITIONS

FIELD OF INVENTION

The invention relates to crosslinkable compositions containing
(1) organosilicon compounds which have radicals containing aliphatic carbon-carbon multiple bonds, and
(2) organosilicon compounds having Si-bonded hydrogen atoms, or,
(3) organosilicon compounds where radicals with aliphatic carbon-carbon multiple bonds and Si-bonded hydrogen atoms are present in the same compound,
(4) catalysts which promote the addition of Si-bonded hydrogen onto aliphatic multiple bond, and
(5) agents which retard the addition of Si-bonded hydrogen onto aliphatic multiple bond at room temperature.

BACKGROUND OF INVENTION

Organopolysiloxane compositions which are curable by reaction of SiH groups with Si-bonded olefinic groups in the presence of a hydrosilylation catalyst are known from U.S. Pat. No. 2,813,218, U.S. Pat. No. 3,249,581 and U.S. Pat. No. 3,436,366.

The term hydrosilylation catalysts is understood as meaning catalysts which promote the addition of Si-bonded hydrogen onto aliphatic multiple bond.

Since crosslinking begins in the course of mixing the above constituents (1), (2) or (3) and (4), it is common practice to make addition-crosslinking organopolysiloxane compositions available in two components, one comprising the olefinically unsaturated organopolysiloxane and the hydrosilylation catalyst and the other comprising the organohydridopolysiloxane crosslinking agent.

If it is necessary to extend the pot life of addition-crosslinking organopolysiloxane compositions or to provide a one-component addition-crosslinking organopolysiloxane composition, an inhibitor can be present.

The term inhibitors is understood as meaning agents which retard the addition of Si-bonded hydrogen onto aliphatic multiple bond at room temperature but do not retard crosslinking at elevated temperatures.

Inhibitors of this kind are heat-deactivatable inhibitors, or are sufficiently volatile to be expelled from the organopolysiloxane compositions at elevated temperature.

GB-A 1,141,868 (published on Feb. 5, 1969, Dow Corning Corp.) describes inhibitors which are organic compounds having at least one —C≡C— group. The compounds are distinguished by their high volatility and a short pot life at slightly elevated temperatures.

EP-A 622 420 (published on Nov. 2, 1994, Rhone-Poulenc Chimie) describes inhibitors which are alkynols of the formula R—(R')C(OH)—C≡CH having long alkyl or phenyl radicals, which are distinguished by their low volatility and by a sufficient pot life at slightly elevated temperatures.

It is known, from Chemical Abstracts 113, 61033m (H. Jasuaki, Nippon Kagaku Kaishi 5, (1990), 541), that alkynols are effective inhibitors.

U.S. Pat. No. 4,603,215 (issued Jul. 29, 1986, Dow Corning Corp.) describes isolatable platinum-alkyne complexes which are prepared by reacting platinum precursors with alkynes of the formula R'—C≡C—R' and can be used for hydrosilylation, hydrogenation, isomerization and oligomerization reactions.

U.S. Pat. No. 4,559,396 (issued Apr. 29, 1993, Toray Silicone Co. Ltd.) discloses unsaturated organic compounds which have a triple bond in conjugation with a double bond. These compounds are distinguished by their high volatility and give assurance of good curing of the addition-crosslinking organopolysiloxane compositions at low temperatures.

SUMMARY OF INVENTION

The object of the present invention is to provide inhibitors which have a low volatility at room temperature extend pot life by retarding the crosslinking of the addition-crosslinking compositions based on organosilicon compounds at room temperature, but which at elevated temperatures permit complete crosslinking of the addition-crosslinking compositions based on organosilicon compounds, i.e. do not impair the crosslinking rate at elevated temperatures, and which in relatively high concentrations can readily be incorporated by mixing into the addition-crosslinking compositions based on organosilicon compounds, and which possess no hazard potential with regard to toxicity and handling.

The invention provides crosslinkable compositions comprising
(1) organosilicon compounds which have radicals containing aliphatic carbon-carbon multiple bonds, and
(2) organosilicon compounds having Si-bonded hydrogen atoms, or,
(3) organosilicon compounds where radicals with aliphatic carbon-carbon multiple bonds and Si-bonded hydrogen atoms are present in the same compound,
(4) catalysts which promote the addition of Si-bonded hydrogen onto aliphatic multiple bond, and
(5) agents which retard the addition of Si-bonded hydrogen onto aliphatic multiple bond at room temperature, of the formula

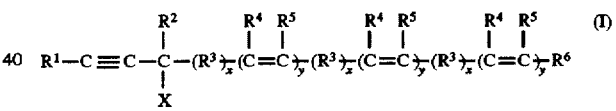

in which $R^1$, $R^2$, $R^4$, $R^5$ and $R^6$ are identical or different and are a hydrogen atom or a monovalent, optionally substituted hydrocarbon radical having 1 to 12 carbon atoms per radical, $R^3$ is a divalent hydrocarbon radical having 1 to 6 carbon atoms per radical, X is a radical of the formula —OH, —Cl, Br and —CN, and x and y are identical or different and are 0 or 1, with the proviso that there is at least one double bond present.

Examples of radicals $R^1$, $R^2$, $R^4$, $R^5$ and $R^6$ are alkyl radicals, such as the methyl, ethyl, n-propyl, isopropyl, 1-n-butyl, 2-n-butyl, isobutyl, tert-butyl, n-pentyl, isopentyl, neopentyl and tert-pentyl radicals; hexyl radicals, such as the n-hexyl radical; heptyl radicals, such as the n-heptyl radical; octyl radicals, such as the n-octyl radical and isooctyl radicals, such as the 2,2,4-trimethylpentyl radical; nonyl radicals, such as the n-nonyl radical; decyl radicals, such as the n-decyl radical; dodecyl radicals, such as the n-dodecyl radical; cycloalkyl radicals, such as the cyclopentyl, cyclohexyl and cycloheptyl radicals and methylcyclohexyl radicals; aryl radicals, such as the phenyl, naphthyl and anthryl and phenanthryl radical; alkaryl radicals, such as o-, m- and p-tolyl radicals; xylyl radicals and ethylphenyl radicals; and aralkyl radicals, such as the benzyl radical, the α- and the β-phenylethyl radical. Preferred examples of the radicals $R^1$, $R^2$, $R^4$, $R^5$ and $R^6$ are a hydrogen atom and the methyl radical.

Examples of halogenated radicals $R^1$, $R^2$, $R^4$, $R^5$ and $R^6$ are haloalkyl radicals, such as the 3,3,3-trifluoro-n-propyl radical, the 2,2,2,2',2',2'-hexafluoroisopropyl radical, the heptafluoroisopropyl radical and haloaryl radicals, such as the o-, m- and p-chlorophenyl radical.

The radical $R^3$ is preferably a linear or branched, substituted or unsubstituted alkyl radical having 1 to 6 carbon atoms per radical. Examples of radicals $R^3$, if x is 1, are alkyl radicals of the formula —$CH_2$—, —$CH(CH_3)$—, —$C(CH_3)$($C_2H_5$)—, —$(CH_2)_2$—, —$(CH_2)_3$—, —$(CH_2)_2$—$CH(CH_3)$— and —$(CH_2)_4$—, with the radical of the formula —$CH_2$—$CH_2$— being preferred.

A preferred radical X is a radical of the formula —OH.

The inhibitor (5) according to the invention have a total of from 6 to 15 carbon atoms, preferably from 8 to 15 carbon atoms and more preferably 10 carbon atoms.

Preferred inhibitors (5) according to the invention are compounds of the formula

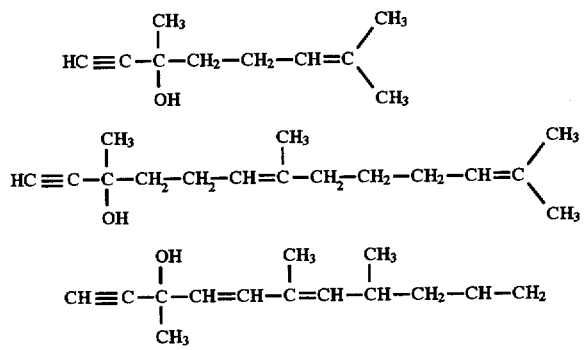

with the first-mentioned compound being preferred.

The first-mentioned compound is commercially available from BASF under the tradename "Dehydrolinalool". The inhibitors (5) according to the invention are prepared via the acetylation of the corresponding ketones.

The inhibitors according to formula (I) are employed in quantities of from 0.1% by weight to 3.0% by weight, preferably in quantities from 0.3% by weight to 1.5% by weight, based on the overall weight of the organosilicon compounds (1) and (2) or, respectively, on the overall weight of the organosilicon compound (3).

The inhibitors according to the invention can be mixed beforehand with the organosilicon compounds (1), (2) or (3) and/or with the catalyst component (4).

The compositions according to the invention with the constituents (1), (2) or (3), (4) and (5) are provided in the form of two-component compositions, with the constituents (2) or (3) and (4) being separate from one another.

The inhibitors of formula (I) can be used in all crosslinkable compositions where it is possible to use inhibitors which retard the addition of Si-bonded hydrogen onto aliphatic multiple bond at room temperature.

As organosilicon compounds (1) which comprise radicals having aliphatic carbon-carbon multiple bonds it is preferred to use linear or branched organopolysiloxanes comprising units of the formula

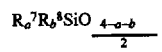

in which

R$^7$ is a monovalent hydrocarbon radical which is free from aliphatic carbon-carbon multiple bonds and has 1 to 18 carbon atoms per radical, and R$^8$ is a monovalent hydrocarbon radical with at least one terminal aliphatic carbon-carbon multiple bond, having 2 to 12 carbon atoms per radical, a is 0, 1, 2 or 3, b is 0, 1 or 2 and the sum a+b is 0, 1, 2 or 3, with the proviso that on average there is at least 1 radical $R^8$ per molecule, preferably at least 2 radicals $R^8$ per molecule.

Preferred organosilicon compounds (1) are organopolysiloxanes of the formula

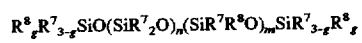

in which $R^7$ and $R^8$ have the meaning given above, g is 0, 1 or 2, n is 0 or an integer from 1 to 1500, and m is 0 or an integer from 1 to 200, with the proviso that there is at least one radical $R^8$ per molecule, preferably at least 2 radicals $R^8$ per molecule.

In formula (III) of the present invention, n units —(SiR$^7_2$O)— and m units —(SiR$^7$R$^8$O)— can be distributed in any desired fashion in the organopolysiloxane molecule.

As organosilicon compounds (1) it is possible to use siloxane copolymers as described in U.S. Pat. No. 5,241,034 and in the German application 195 22 144.3, filed by the Applicant, which consist of siloxane blocks and hydrocarbon blocks.

The organosilicon compounds (1) have an average viscosity of from 100 to 100,000 mPa.s at 25° C., preferably from 100 to 10,000 mPa.s at 25° C., and more preferably from 100 to 500 mPa.s at 25° C.

Examples of hydrocarbon radicals $R^7$ are alkyl radicals, such as the methyl, ethyl, n-propyl, isopropyl, n-butyl, isobutyl, tert-butyl, n-pentyl, isopentyl, neopentyl and tert-pentyl radicals; hexyl radicals, such n-heptyl radical; octyl radicals, such as the n-octyl radical and isooctyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; cycloalkyl radicals, such as cyclopentyl, cyclohexyl and cycloheptyl radicals and methylcyclohexyl radicals; aryl radicals, such as the phenyl, naphthyl, anthryl and phenanthryl radical; alkaryl radicals, such as o-, m- and p-tolyl radicals, xylyl radicals and ethylphenyl radicals; and aralkyl radicals, such as the benzyl radical, the α- and the β-phenylethyl radical.

Examples of radicals $R^8$ are alkenyl radicals, such as the vinyl, 5-hexenyl, 2,4-divinylcyclohexylethyl, 3,4-divinylcyclohexylethyl, 2-propenyl, allyl, 3-butenyl and 4-pentenyl radicals, and alkynyl radicals, such as the ethynyl, propargyl and 2-propynyl radical.

Organosilicon compounds (2) which contain Si-bonded hydrogen atoms, are linear, cyclic or branched organopolysiloxanes comprising units of the formula

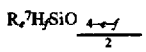  (IV)

in which

R$^7$ has the meaning given above, e is 0, 1, 2 or 3, f is 0, 1 or 2 and the sum of e+f is 0, 1, 2 or 3, with the proviso that on average there is at least 1 Si-bonded hydrogen atom per molecule, preferably at least 2 Si-bonded hydrogen atoms per molecule.

Organosilicon compounds (2) are preferably organopolysiloxanes of the formula

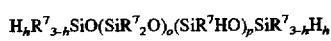  (V)

in which

R has the meaning given above, h is 0, 1 or 2, o is 0 or an integer from 1 to 1500, and p is 0 or an integer from 1 to 200, with the proviso that there is at least 1 Si-bonded hydrogen atom per molecule, in particular at least 2 Si-bonded hydrogen atoms per molecule.

In formula (V) of the present invention it is understood that o units —(SiR$^7_2$O)— and p units —(SiR$^7$HO)— can be distributed in any desired fashion in the organopolysiloxane molecule.

The organosilicon compounds (2) contain at least 0.4% by weight, preferably from 0.8% to 1.7% by weight, of Si-bonded hydrogen. The organosilicon compounds (2) possess an average viscosity of from 10 to 1000 mPa.s at 25° C., preferably from 10 to 100 mPa.s at 25° C.

Organosilicon compounds (2) are employed in quantities of from 0.8 to 3.0, preferably from 1.5 to 2.5, gram atom of Si-bonded hydrogen per mol of Si-bonded radical having aliphatic carbon-carbon multiple bond in the organosilicon compound (1).

Organosilicon compounds (3) which contain both aliphatic carbon-carbon multiple bonds and Si-bonded hydrogen atoms which can be used instead of organosilicon compounds (1) and (2), are preferably those containing units of the formula

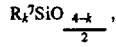  (VI)

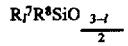  (VII)

and

  (VIII)

in which

R$^7$ and R$^8$ have the meaning given above, k is 0, 1, 2 or 3, l is 0, 1 or 2, q is 0, 1 or 2, with the proviso that per molecule there is on average at least 1 radical R$^8$, preferably at least 2 radicals R$^8$ and on average at least 1 Si-bonded hydrogen atom, preferably at least 2 Si-bonded hydrogen atoms.

Examples of organosilicon compounds (3) are organopolysiloxanes comprising SiO$_{4/2}$, R$^7_3$SiO$_{1/2}$, R$^7_2$R$^8$SiO$_{1/2}$ and R$^7_2$HSiO$_{1/2}$ units, so-called MQ resins, it is possible for these resins to comprise T units (R$^7$SiO$_{3/2}$) and D units (R$^7_2$SiO).

The organosilicon compounds (3) preferably have an average viscosity of from 100 to 100,000 mPa.s at 25° C. or are solids with molecular weights of from 5,000 to 50,000 g/mol.

Catalysts which promote the addition of Si-bonded hydrogen onto aliphatic multiple bonds, are the same catalysts which have been employed to date for promoting the addition of Si-bonded hydrogen onto aliphatic multiple bond.

The catalysts preferably comprise a metal from the group of the platinum metals, such as platinum, palladium or rhodium, or a compound or a complex from the platinum metal group, such as platinum, palladium or rhodium, preferably a compound or a complex of platinum.

Examples of such catalysts are metallic and finely divided platinum, which can be on supports such as silica, alumina or activated carbon, compounds or complexes of platinum, such as platinum halides, for example PtCl$_4$, H$_2$PtCl$_6$*6H$_2$O, Na$_2$PtCl$_4$*4H$_2$O, platinum-olefin complexes, platinum-alcohol complexes, platinum-ketone complexes, platinum-ether complexes, platinum-aldehyde complexes, including reaction products of H$_2$PtCl$_6$*6H$_2$O and cyclohexanone, platinum-vinylsiloxane complexes, such as platinum-1,3-divinyl-1,1,3,3-tetramethyldisiloxane complexes with or without a content of detectable inorganically bonded halogen, bis(gamma-picoline)platinum dichloride, trimethylenedipyridineplatinum dichloride, dicyclopentadiene platinum dichloride, dimethyl sulfoxideethylene-platinum(II) dichloride, cyclooctadiene-platinum dichloride, norbornadiene-platinum dichloride, gamma-picoline-platinum dichloride, cyclopentadiene-platinum chloride and also reaction products of platinum tetrachloride with olefin and primary amine or secondary amine or primary and secondary amine according to U.S. Pat. No. 4,292,434, such as the reaction product of platinum tetrachloride dissolved in 1-octene with sec-butylamine, or ammonium-platinum complexes according to EP-B 110 370.

The catalysts (4) are employed in quantities of from 5 to 300 ppm by weight (parts by weight per million parts by weight), preferably from 20 to 200 ppm by weight, calculated in each case as elemental platinum metal and based on the overall weight of the organosilicon compounds (1) and (2) or on the overall weight of the organosilicon compound (3).

The compositions according to the invention are generally cured at the pressure of the surrounding atmosphere, i.e. at about 1020 hPa (abs.), but can also be cured at higher or lower pressures.

The crosslinking of the compositions according to the invention takes place at a temperature of from 50° C. to 200° C., preferably from 70° C. to 150° C. As energy sources for crosslinking by heating it is preferred to use ovens, for example convection ovens, heating tunnels, heated rolls, heated plates or heat rays in the infrared range.

The compositions according to the invention can, although not preferably, be crosslinked—apart from by heating—by irradiation with ultraviolet light or by irradiation with UV and IR light. The ultraviolet light used is customarily that with a wavelength of 253.7 nm. In commerce there are a large number of lamps which emit ultraviolet light with a wavelength of from 200 to 400 nm, and which preferentially emit ultraviolet light with a wavelength of 253.7 nm.

In the compositions according to the invention it is possible to use inert, organic solvents, although the use of inert, organic solvents is not preferred.

Examples of inert, organic solvents are toluene, xylene, isophorone, octane isomers, butyl acetate and isopropanol.

The compositions according to the invention can be employed for the preparation of coatings which repel tacky substances, in the fields of electronics, coatings and liquid rubber.

The invention additionally provides a process for the preparation of coatings which repel tacky substances, by applying crosslinkable compositions containing (1) organosilicon compounds which have radicals containing aliphatic carbon-carbon multiple bonds, and (2) organosilicon compounds having Si-bonded hydrogen atoms, or (3) organosilicon compounds where radicals with aliphatic carbon-carbon multiple bonds and Si-bonded hydrogen atoms, are present in the same compound, (4) catalysts which promote the addition of Si-bonded hydrogen onto aliphatic multiple bond, and (5) agents which inhibit the addition of Si-bonded hydrogen onto aliphatic multiple bond at room temperature, of the formula

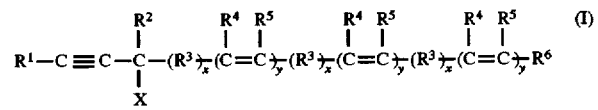

in which $R^1$, $R^2$, $R^4$, $R^5$ and $R^6$ are identical or different and are a hydrogen atom or a monovalent, substituted or unsubstituted hydrocarbon radical having 1 to 12 carbon atoms per radical, $R^3$ is a divalent hydrocarbon radical having 1 to 6 carbon atoms per radical, X is a radical of the formula —OH, —Cl, Br and —CN, and x and y are identical or different and are 0 or 1, with the proviso that there is at least one double bond, to the surfaces to be made repellant to tacky substances, and then curing the compositions.

The application of the compositions according to the invention to the surfaces to be made repellent to tacky substances can be accomplished in any desired manner which is suitable and widely known for the preparation of coatings from liquid substances, for example by dipping, brushing, pouring, spraying, rolling, printing, for example by means of an offset gravur coating device, by knife-coating or by means of an airbrush. Particularly suitable for the application is a multi-roll system (4–5 rolls), such as rubber-steel-rubber etc., in which the film is divided so often that finally an application of from 0.6 to 1.2 μm is obtained.

The surfaces to be made repellant to tacky substances and which can be treated in the context of the invention can comprise surfaces of any desired materials which are solid at room temperature and 1012 mbar (abs.). Examples of such surfaces are those of paper, wood, cork and plastics films, for example polyethylene films or polypropylene films, woven and nonwoven fabric of natural or synthetic fibers or glass fibers, ceramic articles, glass, metals, polyethylene-coated paper, and cards and boards, including those of asbestos. The abovementioned polyethylene can comprise high-pressure, medium-pressure or low-pressure poly- ethylene. The paper can comprise low-grade paper types, such as absorbent papers, including raw kraft paper, i.e. kraft paper which has not been pretreated with chemicals and/or polymeric natural substances, having a weight of from 60 to 150 g/m², unsized papers, papers of low freeness value, mechanical papers, unglazed or uncalendered papers, papers which are smooth on one side owing to the use of a dry glazing cylinder during their production, without additional complex measures, and are therefore referred to as "machine-glazed papers", uncoated papers or papers produced from waste paper, i.e. recycled papers. The paper to be treated in accordance with the invention may also comprise high-grade papers, such as low-absorbency papers, sized papers, papers of high freeness value, chemical papers, calendered or glazed papers, glassine papers, parchmentized papers or precoated papers. The cards and boards may also be of low or high grade.

The compositions according to the invention are suitable, for the production of release, backing and interleaving papers, including interleaving and release papers which are employed in the production of, cast films or decorative films, or of foams, including those of polyurethane. The compositions according to the invention are also suitable for the production of release, backing and interleaving cards, films and cloths, for treating the reverse sides of self-adhesive tapes or self-adhesive films or the written faces of self-adhesive labels. The compositions according to the invention are also suitable for treating packaging material, such as paper, cardboard boxes, metal foils and drums, for example, cardboard, plastic, wood or iron, which is or are intended for the storage and/or transportation of tacky goods, such as adhesives, sticky foodstuffs, for example cakes, honey, candies and meat, bitumen, asphalt, greased materials and crude rubber. A further example of the use of the compositions according to the invention is the treatment of supports for the transfer of contact adhesive layers in the so-called transfer process.

The compositions according to the invention are suitable for the production of the self-adhesive materials connected to the release paper, both by the off-line method and by the in-line method. In the off-line method, the silicone composition is applied to the paper and crosslinked, and then in a subsequent step, usually after the winding-up of the release paper onto a roll and after storage of the roll, an adhesive film, which lies for example on a label face paper, is applied to the coated paper and the composite is then compressed. In the in-line method, the silicone composition is applied to the paper and crosslinked, the silicone coating is coated with the adhesive, the label face paper is then applied to the adhesive and the composite is finally compressed. In the off-line method, the rate of winding is guided by the time which is necessary to render the silicone coating tack-free. In the in-line method, the speed of the process is guided by the time which is necessary to render the silicone coating migration-free. The off-line method and the in-line method can be operated using the compositions according to the invention at a rate of from 50 to 500 m/min, preferably from 100 to 300 m/min.

EXAMPLE 1

Pot life characteristics of an addition-crosslinking organopolysiloxane composition with an inhibitor of the formula

commercially available under the tradename "Dehydrolinalool" from BASF at different temperatures and molar ratios to platinum:

234 mg (1.537×10⁻³ mol) of Dehydrolinalool are added to 100 g of α-ω-divinyldimethylpolysiloxane having a viscosity of 500 mPa.s at 25° C. 3.0 g of a copolymer comprising trimethylsiloxane dimethyl siloxane and methylhydridosiloxane units and having a viscosity of 35 mPa.s at 25° C., which comprises 1.15% by weight of Si-bonded hydrogen, are then added to the reaction mixture. Finally, the platinum catalyst in the form of a platinum-divinyltetramethyldisiloxane complex (preparation as in Angew. Chem. 1991, 103, p. 439) is metered in such that the overall mixture comprises 100 ppm of platinum (based on pure metal). The molar ratio of inhibitor to platinum is 30 to 1.

For the molar ratios 40 and 60 to 1, 312 mg ($2.05 \times 10^{-3}$ mol) and, respectively, 468 mg ($3.075 \times 10^{-3}$ mol) of Dehydrolinalool were added to 100 g of the above-described α-ω-divinyldimethylpolysiloxane.

Table 1 indicates the gel times of the three mixtures at different temperatures, which were determined using a Gel-Timer from Bachofer.

TABLE 1

| Batch | 25° C. | 60° C. | 80° C. | 100° C. |
|---|---|---|---|---|
| 30/1 | 125 h | 0.88 h | 0.15 h | 0.06 h |
| 40/1 | 179 h | 3.2 h | 0.42 h | 0.09 h |
| 60/1 | 492 h | 7.9 h | 0.92 h | 0.13 h |

COMPARISON EXPERIMENT 1

Comparison Experiment to Example 1 with 3,5-dimethyl-1-hexyn-3-ol, commercially available from Aldrich as inhibitor according to GB-A 1,141,868:

The procedure of Example 1 was repeated with the modification that, instead of Dehydrolinalool, 3,5-dimethyl-1-hexyn-3-ol was used. To establish the molar ratios 30/1, 40/1 and 60/1 of inhibitor to platinum, 194 mg, 259 mg and 388 mg of 3,5-dimethyl-1-hexyn-3-ol were weighed in. Table 2 shows the gel times of the three mixtures under analogous conditions.

TABLE 2

| Batch | 25° C. | 60° C. | 80° C. | 100° C. |
|---|---|---|---|---|
| 30/1 | 143 h | 1.22 h | 0.15 h | 0.04 h |
| 40/1 | 187 h | 1.92 h | 0.28 h | 0.07 h |
| 60/1 | 287 h | 6.0 h | 0.75 h | 0.19 h |

In comparison to Dehydrolinalool, 3,5-dimethyl-1-hexyn-3-ol shows distinctly lower values for the gel times at higher contents, the values becoming closer at higher temperatures. With low inhibitor contents, the differences in gel time are only marginal.

COMPARISON EXPERIMENT 2

Comparison Experiment to Example 1 with 3,5-dimethyl-3-hexen-1-yne, preparable by dehydration of 3,5-dimethyl-1-hexyn-3-ol with p-toluenesulfonic acid as inhibitor according to U.S. Pat. No. 4,559,396:

The procedure of Example 1 was repeated with the modification that, instead of Dehydrolinalool, 3,5-dimethyl-3-hexen-1-yne was used. To establish the molar ratios 30/1, 40/1 and 60/1 of inhibitor to platinum, 162 mg, 222 mg and 333 mg of 3,5-dimethyl-3-hexen-1-yne were weighed in. Table 3 shows the gel times of the three mixtures under analogous conditions.

TABLE 3

| Batch | 25° C. | 60° C. | 80° C. | 100° C. |
|---|---|---|---|---|
| 30/1 | 2.1 h | 0.07 h | 0.02 h | 0.02 h |
| 40/1 | 3.5 h | 0.12 h | 0.03 h | 0.02 h |
| 60/1 | 13.5 h | 0.37 h | 0.08 h | 0.03 h |

In comparison to Dehydrolinalool and also to 3,5-dimethyl-1-hexyn-3-ol, 3,5-dimethyl-3-hexen-1-yne shows, at all comparable contents, extremely low values for the gel times and thus a weakly inhibiting action.

EXAMPLE 2

Thin-film pot lives of the mixtures described in Example 1 with inhibitor/platinum ratios of 40 and 60 to 1 at 25° C.:

For this purpose, both mixtures were applied with a glass rod, in a film thickness of about 3–5 mm, to a polyethylene-coated paper from PWA - Raubling, and the coated papers were tempered in a convection oven at 25° C. The thin-film pot life was determined by means of a stroke test, i.e. the test was stopped at the time when the film was no longer tacky. The results are summarized in Table 4.

TABLE 4

| Batch | Thin-film pot life in minutes |
|---|---|
| 40/1 | 112 |
| 60/1 | 190 |

COMPARISON EXPERIMENT 3

Comparison Experiment to Example 2 with mixtures from Comparison Experiment 1:

The procedure of Example 2 was repeated with the modification that, instead of the mixtures from Example 2, the mixtures from Comparison Experiment 1 were used. Table 5 indicates the thin-film pot lives.

TABLE 5

| Batch | Thin-film pot life in minutes |
|---|---|
| 40/1 | 50 |
| 60/1 | 130 |

As the comparison of Table 4 and 5 shows, the mixtures with Dehydrolinalool in equal molar ratios to platinum have a thin-film pot life which is higher by a factor of 1.5–2 than for those with 3,5-dimethyl-1-hexyn-3-ol.

COMPARISON EXPERIMENT 4

Comparison Experiment to Example 2 with mixtures from Comparison Experiment 2:

The procedure of Example 2 was repeated with the modification that, instead of the mixtures from Example 2, the mixtures from Comparison Experiment 2 were used. Table 6 indicates the thin-film pot lives.

TABLE 6

| Batch | Thin-film pot life in minutes |
|---|---|
| 40/1 | 21 |
| 60/1 | 53 |

With regard to the thin-film pot life, 3,5-dimethyl-3-hexen-1-yne shows an inhibiting effect which is lower by a factor of 4-5 than that of Dehydrolinalool.

EXAMPLE 3

Reaction rates of the mixtures described in Example 1 with inhibitor/platinum ratios of 40 and 60 to 1 at 120° C.:

For this purpose, both mixtures were applied, in each case with a glass rod, in a film thickness of about 3-5 μm, to a polyethylene-coated paper from PWA - Raubling, and the coatings were vulcanized for nine seconds at 120° C. The siliconized substrate was subsequently bonded with the acrylate adhesive A 7475 from Beiersdorf and tempered at 70° C. for 20 hours. The release force was determined at a peel-off rate of 300 mm/min using an instrument from Roell - Korthaus. The results are summarized in Table 7.

TABLE 7

| Batch | Release force in cN/cm |
|---|---|
| 40/1 | 6.5 |
| 60/1 | 7.0 |

COMPARISON EXPERIMENT 5

Comparison Experiment to Example 3 with mixtures from Comparison Experiment 1:

The procedure of Example 3 was repeated with the modification that, instead of the mixtures from Example 3, the mixtures from Comparison Experiment 1 were used. Table 8 indicates the release forces.

TABLE 8

| Batch | Release force in cN/cm |
|---|---|
| 40/1 | 6.4 |
| 60/1 | 7.2 |

COMPARISON EXPERIMENT 6

Comparison Experiment to Example 3 with mixtures from Comparison Experiment 2:

The procedure of Example 3 was repeated with the modification that, instead of the mixtures from Example 3, the mixtures from Comparison Experiment 2 were used. Table 9 indicates the release forces.

TABLE 9

| Batch | Release force in cN/cm |
|---|---|
| 40/1 | 7.0 |
| 60/1 | 8.9 |

A summary of the results from Examples 1 to 3 and Comparison Experiments 1 to 6 shows that, with Dehydrolinalool as inhibitor according to the invention, in contrast to 3,5-dimethyl-1-hexyn-3-ol and 3,5-dimethyl-3-hexen-1-yne as inhibitors according to the prior art, in each case at equal molar ratios to elemental platinum, better gel times and thin-film pot lives are obtained for equal vulcanization rates of the addition-crosslinking organopolysiloxane compositions.

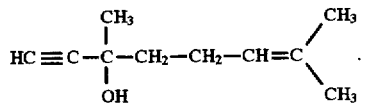

What is claimed is:

1. A crosslinkable composition containing (1) an organosilicon compound having radicals containing aliphatic carbon-carbon multiple bonds, and (2) an organosilicon compound having Si-bonded hydrogen atoms, or (3) an organosilicon compound having both radicals with aliphatic carbon-carbon multiple bonds and Si-bonded hydrogen atoms, (4) a catalyst which promotes the addition of Si-bonded hydrogen onto an aliphatic multiple bond, and (5) an agent which inhibits the addition of Si-bonded hydrogen onto an aliphatic multiple bond at room temperature, of the formula

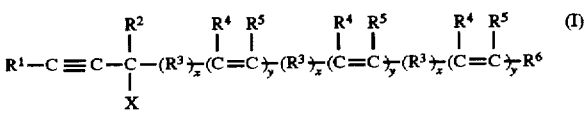

in which $R^1$, $R^2$, $R^4$, $R^5$ and $R^6$ are identical or different and are a hydrogen atom or a monovalent, substituted or unsubstituted hydrocarbon radical having 1 to 12 carbon atoms per radical, $R^3$ is a divalent hydrocarbon radical having 1 to 6 carbon atoms per radical, X is a radical of the formula —OH, —Cl, Br or —CN, and x and y are identical or different and are 0 or 1, with the proviso that there is at least one double bond.

2. Crosslinkable compositions according to claim 1, wherein the agent (5) has the formula

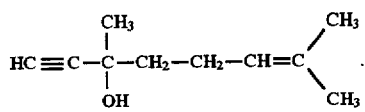

3. A process for the preparation of coatings which repel tacky substances, comprising; applying a crosslinkable composition containing (1) an organosilicon compound having radicals containing aliphatic carbon-carbon multiple bonds, and (2) an organosilicon compound having Si-bonded hydrogen atoms, or (3) an organosilicon compound having both radicals with aliphatic carbon-carbon multiple bonds and Si-bonded hydrogen atoms, (4) a catalyst which promotes the addition of Si-bonded hydrogen onto an aliphatic multiple bond, and (5) an agent which inhibits the addition of Si-bonded hydrogen onto an aliphatic multiple bond at room temperature, of the formula

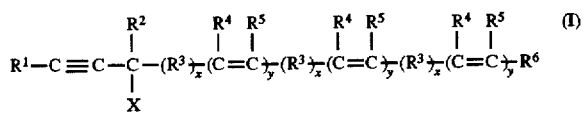

in which
- $R^1$, $R^2$, $R^4$, $R^5$ and $R^6$ are identical or different and are a hydrogen atom or a monovalent, substituted or unsubstituted hydrocarbon radical having 1 to 12 carbon atoms per radical,
- $R^3$ is a divalent hydrocarbon radical having 1 to 6 carbon atoms per radical,
- X is a radical of the formula —OH, —Cl, Br or —CN, and x and y are identical or different and are 0 or 1, with the proviso that there is at least one double bond, to a surface to be made repellant and then curing the composition.

4. A process according to claim 3, wherein the agent (5) has the formula